United States Patent
Araki et al.

(10) Patent No.: US 10,181,382 B2
(45) Date of Patent: *Jan. 15, 2019

(54) SOLID ELECTROLYTIC CAPACITOR

(71) Applicants: TOKIN CORPORATION, Miyagi (JP); KEMET Electronics Corporation, Simpsonville, SC (US)

(72) Inventors: Kenji Araki, Miyagi (JP); Takashi Kono, Miyagi (JP); Takashi Mihara, Miyagi (JP); Yoshihiko Saiki, Tokyo (JP)

(73) Assignees: TOKIN CORPORATION, Sendai-Shi (JP); KEMET ELECTRONICS CORPORATION, Simpsonville, SC (US)

( * ) Notice: Subject to any disclaimer, the term of this patent is extended or adjusted under 35 U.S.C. 154(b) by 246 days.

This patent is subject to a terminal disclaimer.

(21) Appl. No.: 14/558,892

(22) Filed: Dec. 3, 2014

(65) Prior Publication Data

US 2015/0155102 A1 Jun. 4, 2015

(30) Foreign Application Priority Data

Dec. 4, 2013 (JP) ................................. 2013-250968

(51) Int. Cl.
*H01G 9/048* (2006.01)
*H01G 9/15* (2006.01)
*H01G 9/042* (2006.01)

(52) U.S. Cl.
CPC ........... *H01G 9/048* (2013.01); *H01G 9/0425* (2013.01); *H01G 9/15* (2013.01)

(58) Field of Classification Search
CPC .................................................... H01G 9/0029
See application file for complete search history.

(56) References Cited

U.S. PATENT DOCUMENTS

| | | | |
|---|---|---|---|
| 4,571,664 A | 2/1986 | Hyland | |
| 9,224,539 B2 * | 12/2015 | Kosuge | H01G 9/025 |
| 2010/0265634 A1 * | 10/2010 | Freeman | H01G 9/012 |
| | | | 361/529 |

(Continued)

FOREIGN PATENT DOCUMENTS

| | | |
|---|---|---|
| JP | A S59-219924 | 12/1984 |
| JP | S61159722 | 7/1986 |

(Continued)

*Primary Examiner* — Fernando L Toledo
*Assistant Examiner* — Valerie N Newton
(74) *Attorney, Agent, or Firm* — Joseph T. Guy; Patent Filing Specialist, Inc.

(57) ABSTRACT

A solid electrolytic capacitor includes a capacitor element and a plated layer. The capacitor element has a predetermined surface and outer peripheral surface other than the predetermined surface. The capacitor element includes an anode body, an anode lead wire and a cathode layer. The predetermined surface is perpendicular to a predetermined direction. The anode lead wire extends from the anode body along the predetermined direction through the predetermined surface. The cathode layer includes a solid electrolyte layer and forms the outer peripheral surface and a part of the predetermined surface. The plated layer completely covers the outer peripheral surface and the part of the predetermined surface.

12 Claims, 14 Drawing Sheets

(56) References Cited

U.S. PATENT DOCUMENTS

2014/0168859 A1* 6/2014 Poltorak ................ H01G 9/028
  361/528
2015/0155101 A1* 6/2015 Araki ................... H01G 9/0029
  205/80

FOREIGN PATENT DOCUMENTS

| JP | H02125604 | 5/1990 |
| JP | 2776330 | 5/1998 |
| JP | 2004087872 | 3/2004 |
| JP | 2006269571 | 10/2006 |
| JP | 4325354 | 6/2009 |

* cited by examiner

SOLID ELECTROLYTIC CAPACITOR

CROSS REFERENCE TO RELATED APPLICATIONS

Applicants claim priority under 35 U.S.C. § 119 of Japanese Patent Application No. JP2013-250968 filed Dec. 4, 2013.

BACKGROUND OF THE INVENTION

This invention relates to a solid electrolytic capacitor which has high humidity resistance.

Conductive polymer has high conductivity and can provide low equivalent series resistance (ESR) in a solid electrolytic capacitor. Therefore, if a solid electrolyte layer is formed of conductive polymer, a solid electrolytic capacitor becomes downsized and comes to have a large capacitance. A solid electrolytic capacitor of this type is disclosed in JPB2776330, which is incorporated herein by reference.

The solid electrolytic capacitor of JPB2776330 has low humidity resistance so that its solid electrolyte layer is easily degraded or oxidized. Likewise, if a solid electrolytic capacitor that includes a solid electrolyte layer made of manganese dioxide has low humidity resistance, the solid electrolyte layer of manganese becomes damaged.

SUMMARY OF THE INVENTION

It is therefore an object of the present invention to provide a solid electrolytic capacitor that has high humidity resistance.

One aspect of the present invention provides a solid electrolytic capacitor which includes a capacitor element and a plated layer. The capacitor element has a predetermined surface and an outer peripheral surface other than the predetermined surface. The capacitor element includes an anode body, an anode lead wire and a cathode layer. The predetermined surface is perpendicular to a predetermined direction. The anode lead wire extends from the anode body along the predetermined direction through the predetermined surface. The cathode layer includes a solid electrolyte layer and forms the outer peripheral surface and a part of the predetermined surface. The plated layer completely covers the outer peripheral surface and the part of the predetermined surface.

Unlike an insulator layer, a graphite layer, a silver paste layer or an electrolytic polymerization layer, the plated layer does not allow water or oxygen to pass therethrough. Since the plated layer completely covers the outer peripheral surface and the part of the predetermined surface, the plated layer can reduce degradation or oxidization of the solid electrolyte layer.

An appreciation of the objectives of the present invention and a more complete understanding of its structure may be had by studying the following description of the preferred embodiment and by referring to the accompanying drawings.

Figure 1:
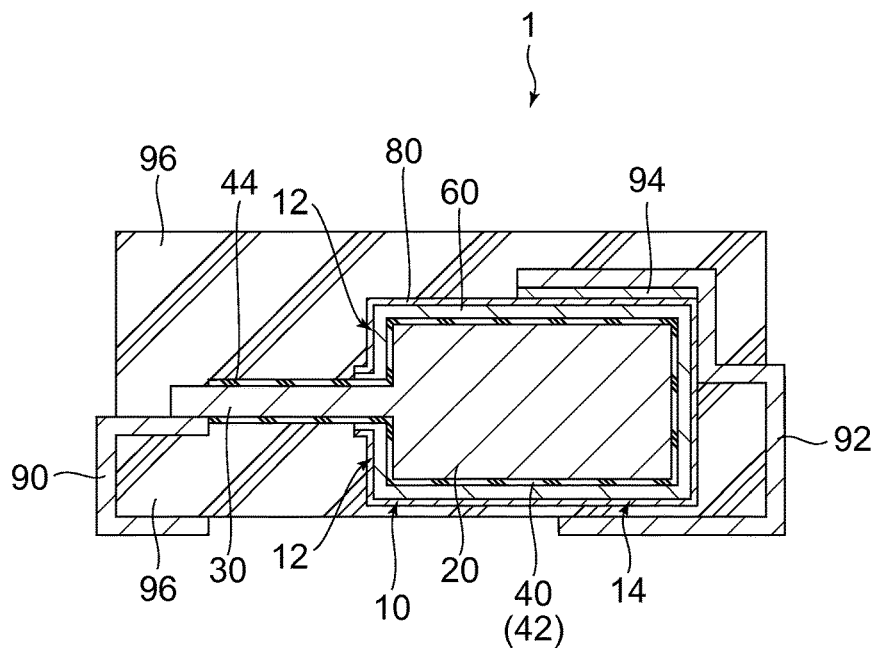
FIG. 1 is a cross-sectional view showing a solid electrolytic capacitor according to a first embodiment of the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DESCRIPTION OF PREFERRED EMBODIMENTS

Figure 2:
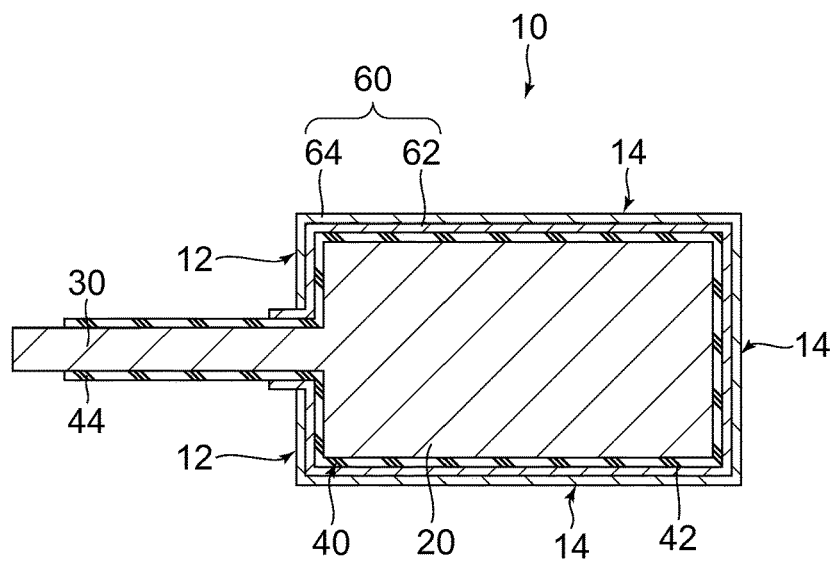
FIG. 2 is a cross sectional view showing a capacitor element included in the solid electrolytic capacitor of FIG. 1.

With reference to FIG. 1, a solid electrolytic capacitor 1 according to a first embodiment of the present invention comprises a capacitor element 10, a plated layer 80, an anode terminal 90, a cathode terminal 92 and an outer insulation member 96. As shown in FIG. 2, the capacitor element 10 has a predetermined surface 12 and an outer peripheral surface 14 other than the predetermined surface 12, wherein the predetermined surface 12 is perpendicular to a predetermined direction, i.e. a lateral direction in FIG. 2. The illustrated capacitor element 10 comprises an anode body 20, an anode lead wire 30, a dielectric layer 40 and a cathode layer 60.

The anode body 20 of the present embodiment is formed of sintered tantalum powder. The anode lead wire 30 is a tantalum wire and is partially embedded in the anode body 20. The anode lead wire 30 extends through the predetermined surface 12 along the predetermined direction. The dielectric layer 40 has a first part 42 and a second part 44, wherein the first part 42 is formed on the anode body 20 while the second part 44 is formed on the anode lead wire 30. Although the first part 42 and the second part 44 are conceptually distinct from each other for the sake of better understanding, the first part 42 and the second part 44 are formed integrally with each other upon a common process. In detail, the anode lead wire 30 of the tantalum wire is partially embedded in tantalum powder, and the tantalum power is then press-molded so that a molded member is obtained. Subsequently, the molded member is sintered so that the anode body 20 of the sintered tantalum power is formed. Thereafter, the anode body 20 and the anode lead wire 30 are soaked into an aqueous solution of phosphoric acid to be anodized so that the dielectric layer 40 made of an anodic oxide film is formed. Specifically, the first part 42 of the anodic oxide film is formed on the surface of the anode body 20 while the second part 44 of the anodic oxide film is formed on the surface of the anode lead wire 30. The anodization may use another solution.

As shown in FIG. 2, the cathode layer 60 of the present embodiment is formed all over the first part 42 of the dielectric layer 40 and extends over a part of the second part 44 of the dielectric layer 40, especially the vicinity of the root of the anode lead wire 30. The cathode layer 60 may not be formed on the second part 44, provided that the cathode layer 60 is formed on at least the first part 42. The illustrated cathode layer 60 includes a solid electrolyte layer 62 and a conductive layer 64. However, the present invention is not limited thereto. The cathode layer 60 may have another structure, provided that the cathode layer 60 includes a solid electrolyte layer 62. As understood from FIG. 2, the cathode layer 60 constitutes an almost region of the predetermined surface 12 and the outer peripheral surface 14.

The solid electrolyte layer 62 of the present embodiment is made of polythiophene. Namely, the solid electrolyte layer 62 of the present embodiment is made of conductive polymer. The solid electrolyte layer 62 is formed on the dielectric layer 40 by alternately soaking the dielectric layer 40, mainly the first part 42, into a liquid of thiophene and an oxidizer so that a chemical polymerization is repeatedly carried out. The oxidizer is a methanol solution containing 30% ferric paratoluenesulfonate. The oxidizer may be made of another solution. The solid electrolyte layer 62 of polythiophene is formed by alternately repeating an impregnation process by using conductive polymer slurry and a drying process.

The conductive layer 64 of the present invention is made of graphite paste layer. The conductive layer 64 is formed on the solid electrolyte layer 62. The conductive layer 64 may be made of another conductive material. Thus, the capacitor element 10 is obtained.

The plated layer 80 of the present embodiment completely covers the outer peripheral surface 14 and the almost region of the predetermined surface 12.

Specifically, the plated layer 80 of the present embodiment is formed all over the cathode layer 60. The plated layer 80 may cover a smaller region of the predetermined surface 12. The part of the predetermined surface 12 covered by the plated layer 80 should have an area equal to or more than 10% of a total area of the predetermined surface 12 and, in particular, preferably has an area equal to or more than 50% of a total area of the predetermined surface in order to obtain remarkable humidity resistance.

Figure 3:
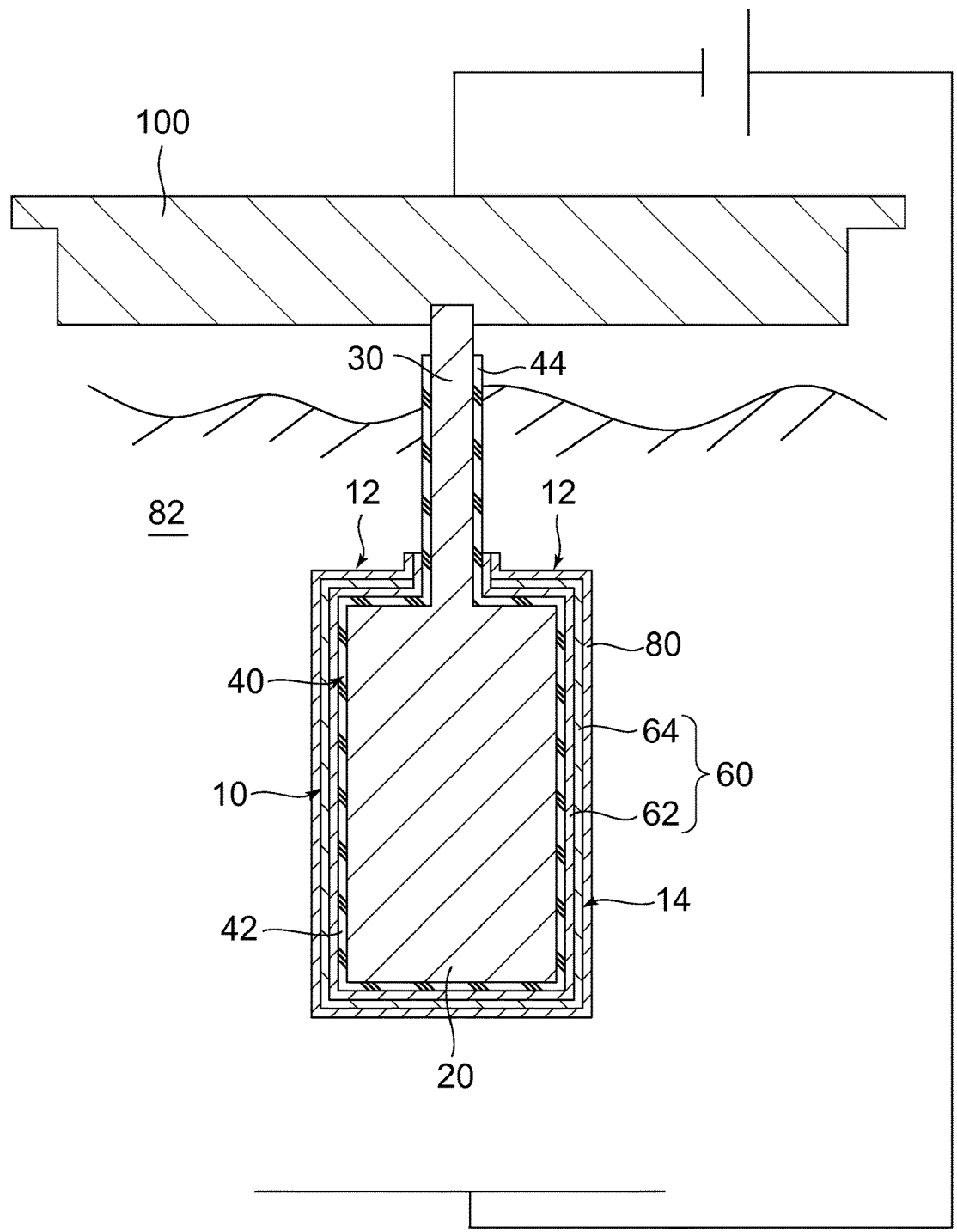
FIG. 3 is a view showing a process of formation of the solid electrolytic capacitor of FIG. 1.

In this embodiment, the plated layer 80 is formed via electroplating method. In detail, as shown in FIG. 3, the capacitor element 10 is soaked into a plating solution 82 while an end of the anode lead wire 30 is supported by a supporter 100 made of aluminum. In addition, a voltage is applied between the plating solution 82 and the supporter 100 so that an electric potential of the plating solution 82 is higher than another electric potential of the supporter 100, i.e. an electric potential of the anode lead wire 30. The plating solution 82 of the present embodiment is an aqueous solution of copper sulfate. However, the plating solution 82 may be made of another solution. Thus, the plated layer 80 is formed. The plated layer 80 of the present embodiment is a plated copper layer. The plated layer 80 may be made of another metal. The plated layer 80 may be formed via other electroplating method or may be formed via electroless plating.

Each of the anode terminal 90 and the cathode terminal 92 is made of a base member of 42 alloy plated with solder. However, each of the anode terminal 90 and the cathode terminal 92 may be made of another metal. The anode lead wire 30 is welded to the anode terminal 90 through resistance welding. On the other hand, the cathode terminal 92 is bonded to the cathode layer 60 by using a conductive resin 94. The conductive resin 94 of the present embodiment is made of silver paste. Instead of the conductive resin 94, another conductive adhesive agent may be used. Furthermore, the anode lead wire 30 and the anode terminal 90 may be connected with each other via other connection means. Likewise, the cathode layer 60 and the cathode terminal 92 may be connected with each other via other connection means.

The outer insulation member 96 is formed so as to enclose a part of the anode terminal 90 and a part of the cathode terminal 92 and to pack the whole capacitor element 10. The outer insulation member 96 of the present embodiment is made of epoxy resin and is formed by carrying out injection molding with a metal mold of a predetermined shape, followed by hardening it. However, the outer insulation member 96 may be made of another insulative member. Thus, the capacitor element 10 is sealed off by the outer insulation member 96. After the formation of the outer insulation member 96, each of the anode terminal 90 and the cathode terminal 92 is folded to the bottom of the outer insulation member 96 to have an angular C-shape. Thus, the solid electrolytic capacitor 1 is obtained.

Since the plated layer 80 of the present embodiment covers the whole cathode layer 60 as described above, it is hard for oxygen or moisture to reach the solid electrolyte layer 62. Therefore, the present embodiment can reduce degradation of the solid electrolyte layer 62.

A solid electrolytic capacitor according to a second embodiment of the present invention is different from the solid electrolytic capacitor according to the aforementioned first embodiment in structure of the capacitor element; they are same as each other in components other than the capacitor element such as the anode terminal and the cathode terminal.

Figure 4:
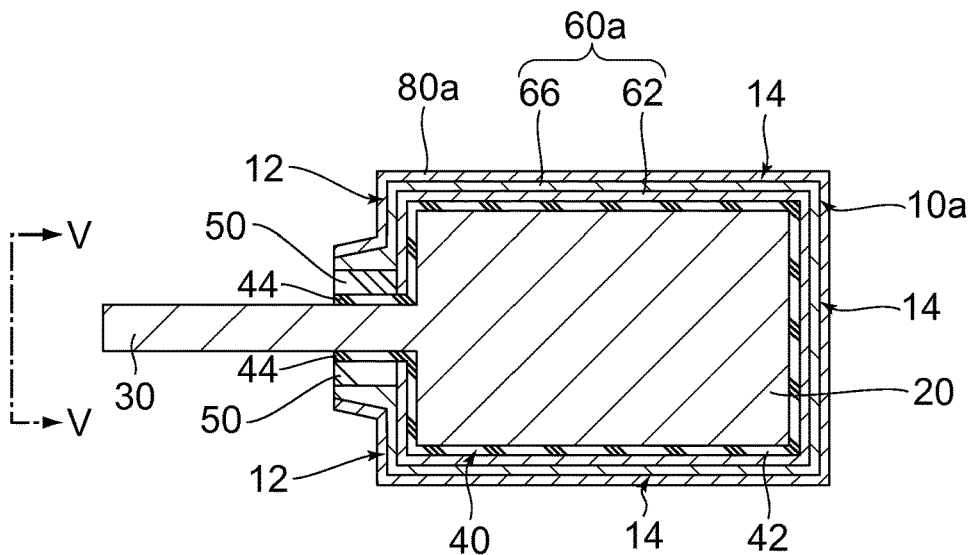
FIG. 4 is a cross-sectional view showing a capacitor element and a plated layer which are included in a solid electrolytic capacitor according to a second embodiment of the present invention.
Figure 5:
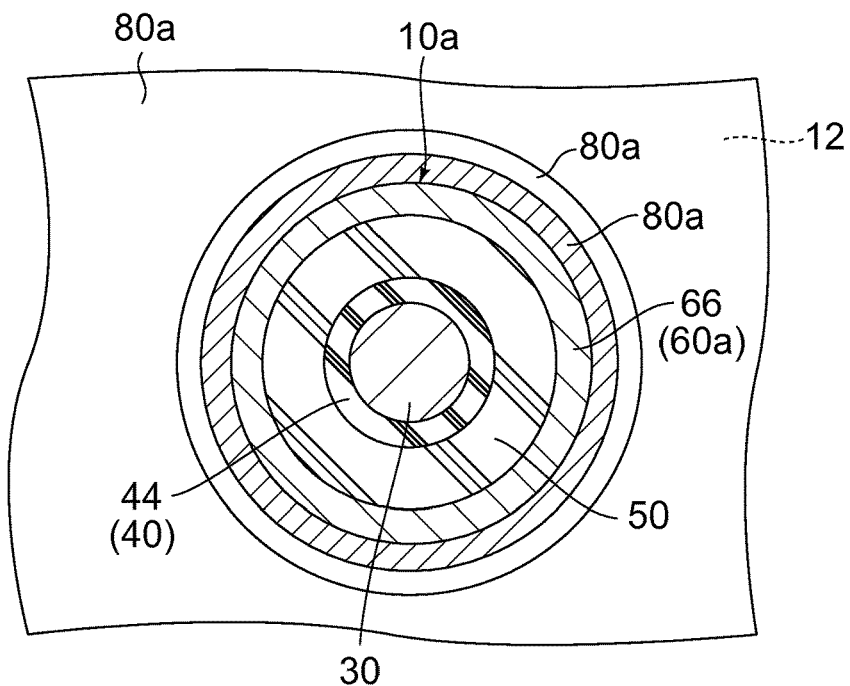
FIG. 5 is a view showing the capacitor element and the plated layer, taken along direction of V-V arrow.

With reference to FIGS. 4 and 5, a capacitor element 10a according to the present embodiment is a modification of the capacitor element 10 of the above-mentioned first embodiment. In FIGS. 4 and 5, components same as those of FIG. 2 are depicted with reference numerals same as those of the same components; explanation about those components will be omitted.

Figure 6:
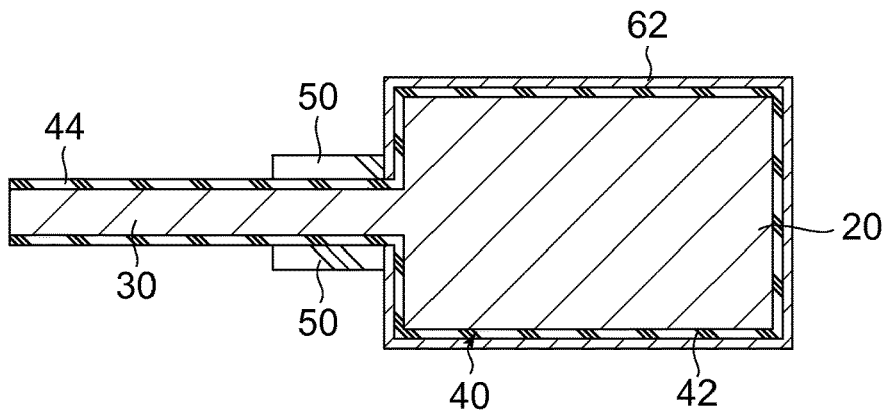
FIG. 6 is a view showing a process of formation of the capacitor element of FIG. 4.

As shown in FIGS. 4 and 5, the capacitor element 10a of the present embodiment further includes an insulative section 50. The insulative section 50 is formed on the second part 44 of the dielectric layer 40. More specifically, the insulative section 50 is positioned around a root of the anode lead wire 30. The insulative section 50 of the present embodiment is made of epoxy resin. However, the insulative section 50 may be made of another insulative member. As shown in FIG. 6, the insulative section 50 is formed after the formation of the solid electrolyte layer 62 of a cathode layer 60a. The insulative section 50 may be formed before the formation of the solid electrolyte layer 62.

As understood from FIG. 4, the cathode layer 60a of the present embodiment is formed all over the first part 42 of the dielectric layer 40 and the insulative section 50. The illustrated cathode layer 60a includes the solid electrolyte layer 62 and a conductive layer 66. The conductive layer 66 of the present embodiment is a conductive coating layer which is formed by graphite paste after the formation of the insulative section 50. The illustrated conductive layer 66 is connected to the solid electrolyte layer 62 and is also formed on the insulative section 50. In this embodiment, after the formation of the conductive layer 66, a plated layer 80a is formed by using the conductive layer 66.

Figure 7:
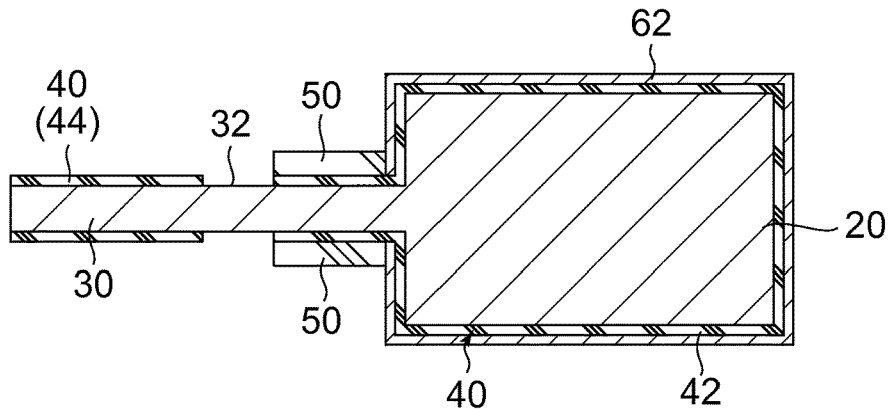
FIG. 7 is a view showing another process of the formation of the capacitor element of FIG. 4.
Figure 8:
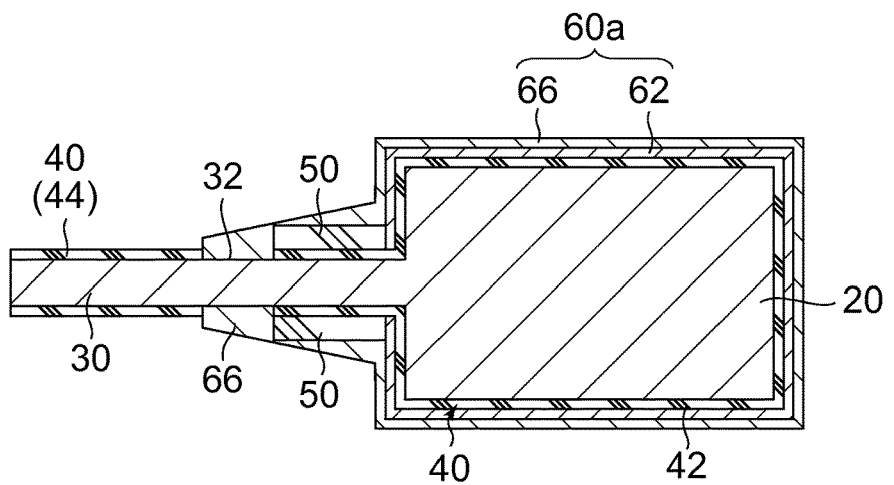
FIG. 8 is a view showing another process of the formation of the capacitor element of FIG. 4.
Figure 9:
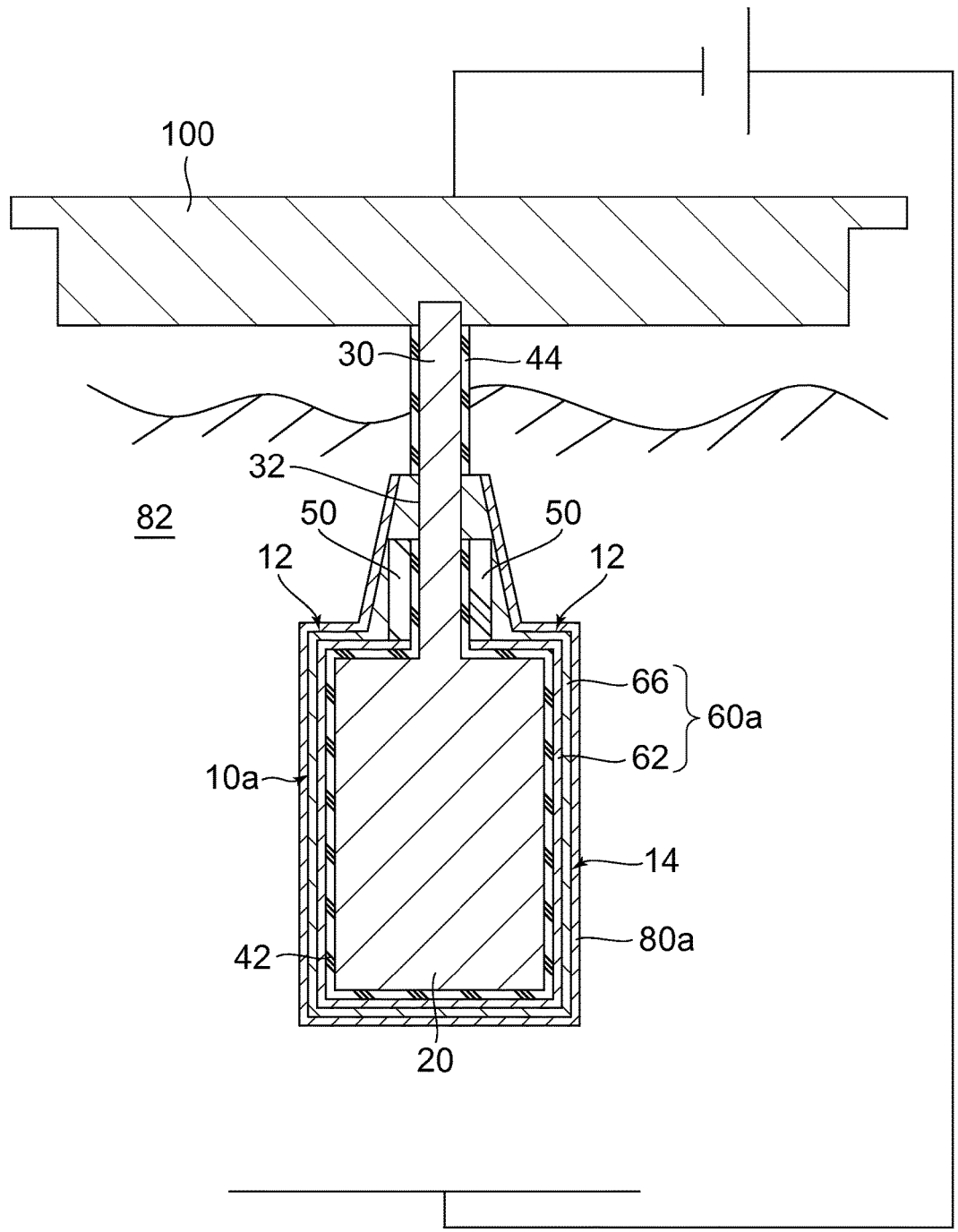
FIG. 9 is a view showing a process of formation of the plated layer of FIG. 4.
Figure 10:
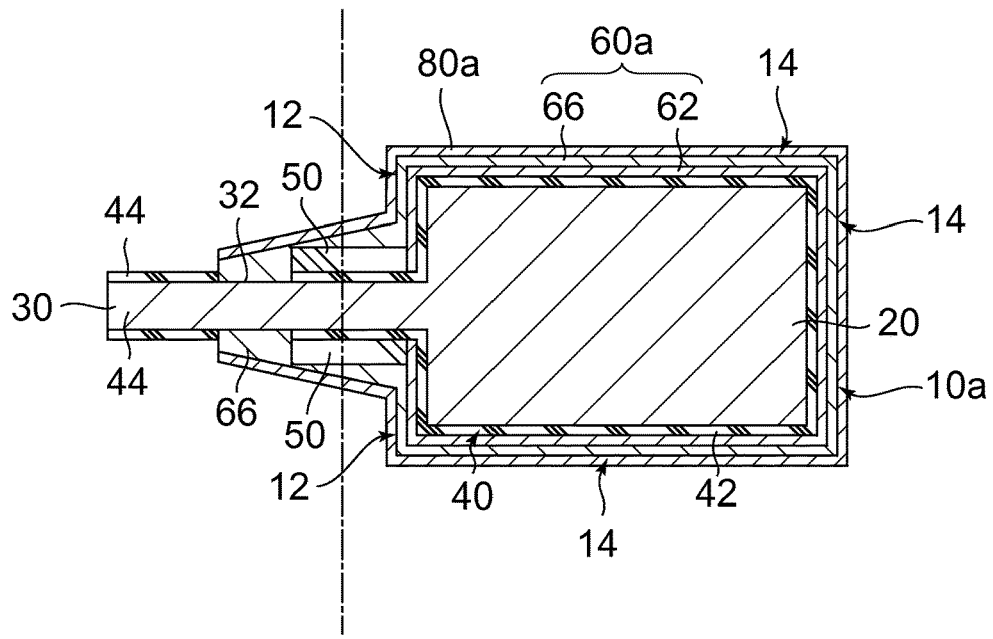
FIG. 10 is a view showing a process of formation of the capacitor element and the plated layer of FIG. 4.

In detail, as show in FIG. 7, after the formation of the insulative section 50, the second part 44 of the dielectric layer 40 is partially removed with a laser so that a part of the anode lead wire 30 is exposed as an exposed portion 32. Next, as shown in FIG. 8, the graphite paste is applied so as to cover the solid electrolyte layer 62, the insulative section 50 and the exposed portion 32. Thereafter, as shown in FIG. 9, the cathode layer 60a and so on is soaked into the plating solution 82 while an end of the anode lead wire 30 is supported by the supporter 100 made of aluminum. In addition, a voltage is applied between the plating solution 82 and the supporter 100 so that an electric potential of the plating solution 82 is higher than another electric potential of the supporter 100, i.e. an electric potential of the anode lead wire 30 or an electric potential of the cathode layer 60a. Thus, the plated layer 80a is formed. Subsequently, as understood from FIGS. 4 and 10, the plated layer 80a, the conductive layer 66, the insulative section 50 and the second part 44 are partially removed by using a laser so that the capacitor element 10a covered with the plated layer 80a is obtained.

The plated layer 80a of the present embodiment is formed via electroplating method, which is however different from the electroplating method of the aforementioned first embodiment in that the conductive layer 66 and the anode lead wire 30 are connected at the exposed portion 32. The present invention is not limited thereto. The plated layer 80a may be formed via other electroplating method including the electroplating method of the first embodiment or may be formed via electroless plating.

Since the plated layer 80a of the present embodiment covers the whole cathode layer 60, the present embodiment can reduce degradation of the solid electrolyte layer 62.

In addition, the insulative section 50 makes a large distance between the anode lead wire 30 and the cathode layer 60a so that the insulative section 50 can prevent them from being short-circuited with each other.

Figure 11:
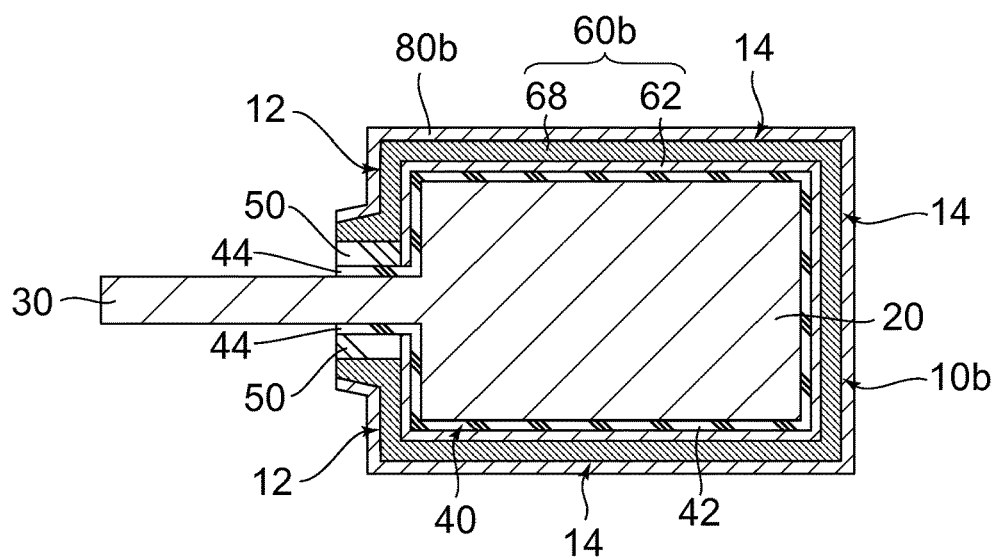
FIG. 11 is a cross-sectional view showing a capacitor element and a plated layer which are included in a solid electrolytic capacitor according to a third embodiment of the present invention.

With reference to FIG. 11, a capacitor element 10b according to a third embodiment of the present invention is a modification of the capacitor element 10a of the above-mentioned second embodiment. In FIG. 11, components same as those of FIG. 4 are depicted with reference numerals same as those of the same components; explanation about those components will be omitted.

As shown in FIG. 11, a cathode layer 60b of the present embodiment includes the solid electrolyte layer 62 and a conductive layer 68. The conductive layer 68 of the present embodiment is an electrolytic polymerization layer which is formed after the formation of the insulative section 50. The illustrated conductive layer 68 is connected to the solid electrolyte layer 62 and is also formed on the insulative section 50. In this embodiment, after the formation of the conductive layer 68, a plated layer 80b is formed by using the conductive layer 68.

Figure 12:
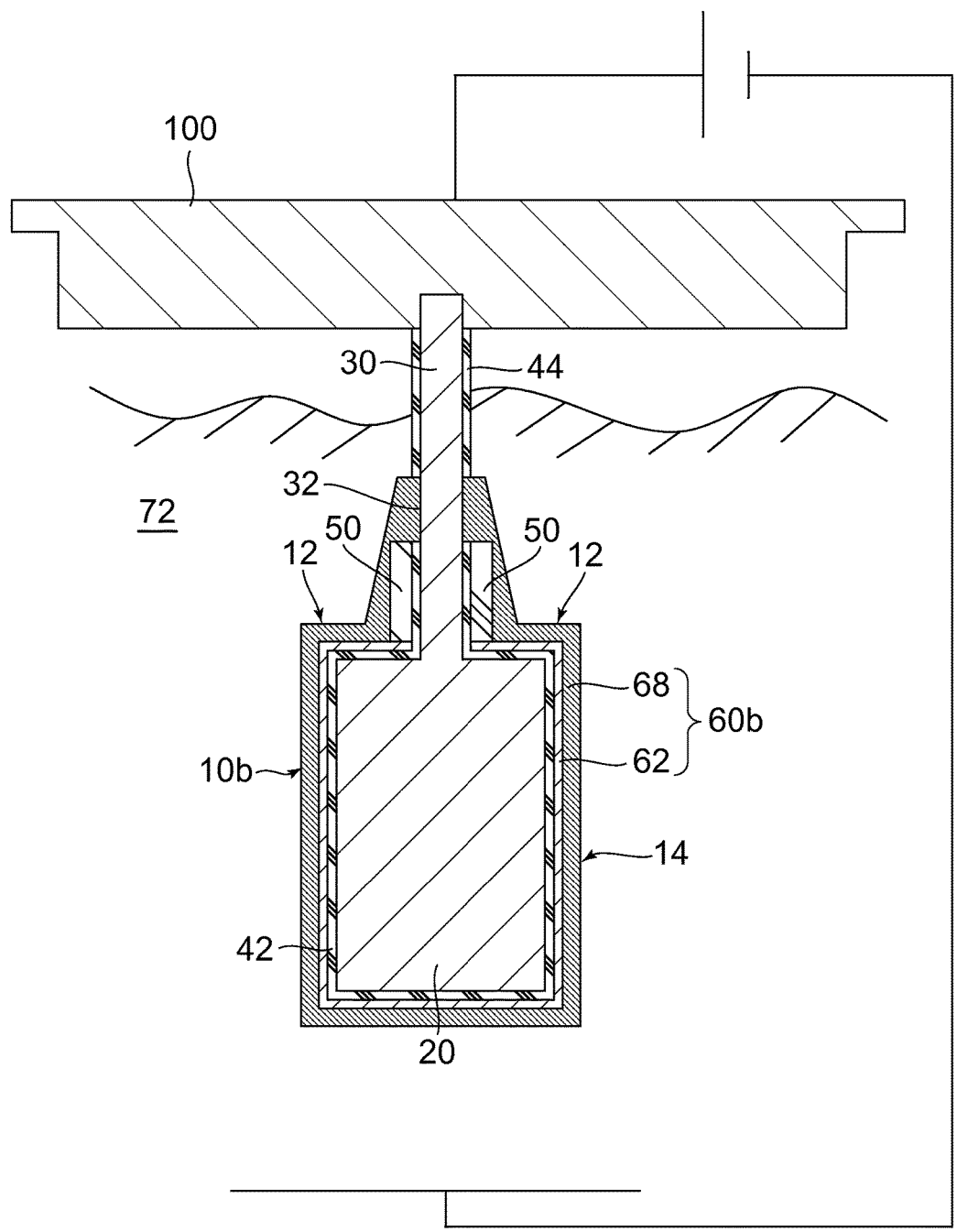
FIG. 12 is a view showing a process of formation of the capacitor element of FIG. 11.

In detail, as shown in FIG. 12, after the formation of the insulative section 50 and the exposed portion 32, the electrolyte layer 62 and the exposed portion 32 are soaked into a solution of monomers 72 while an end of the anode lead wire 30 is supported by the supporter 100 made of aluminum. The solution of monomers 72 of the present embodiment is an aqueous solution containing 5% pyrrole. In addition, a voltage is applied between the solution of monomers 72 and the supporter 100 so that an electric potential of the solution of monomers 72 is lower than another electric potential of the supporter 100, i.e. an electric potential of the anode lead wire 30 or an electric potential of the solid electrolyte layer 62. Thus, electrolytic polymerization is carried out by using the exposed portion 32 as a starting point thereof, so that the conductive layer 68 is formed. The conductive layer 68 of the present embodiment is made of polypyrrole. The solution of monomers 72 may be another solution of monomers, and the conductive layer 68 may be made of another conductive polymer.

Figure 13:
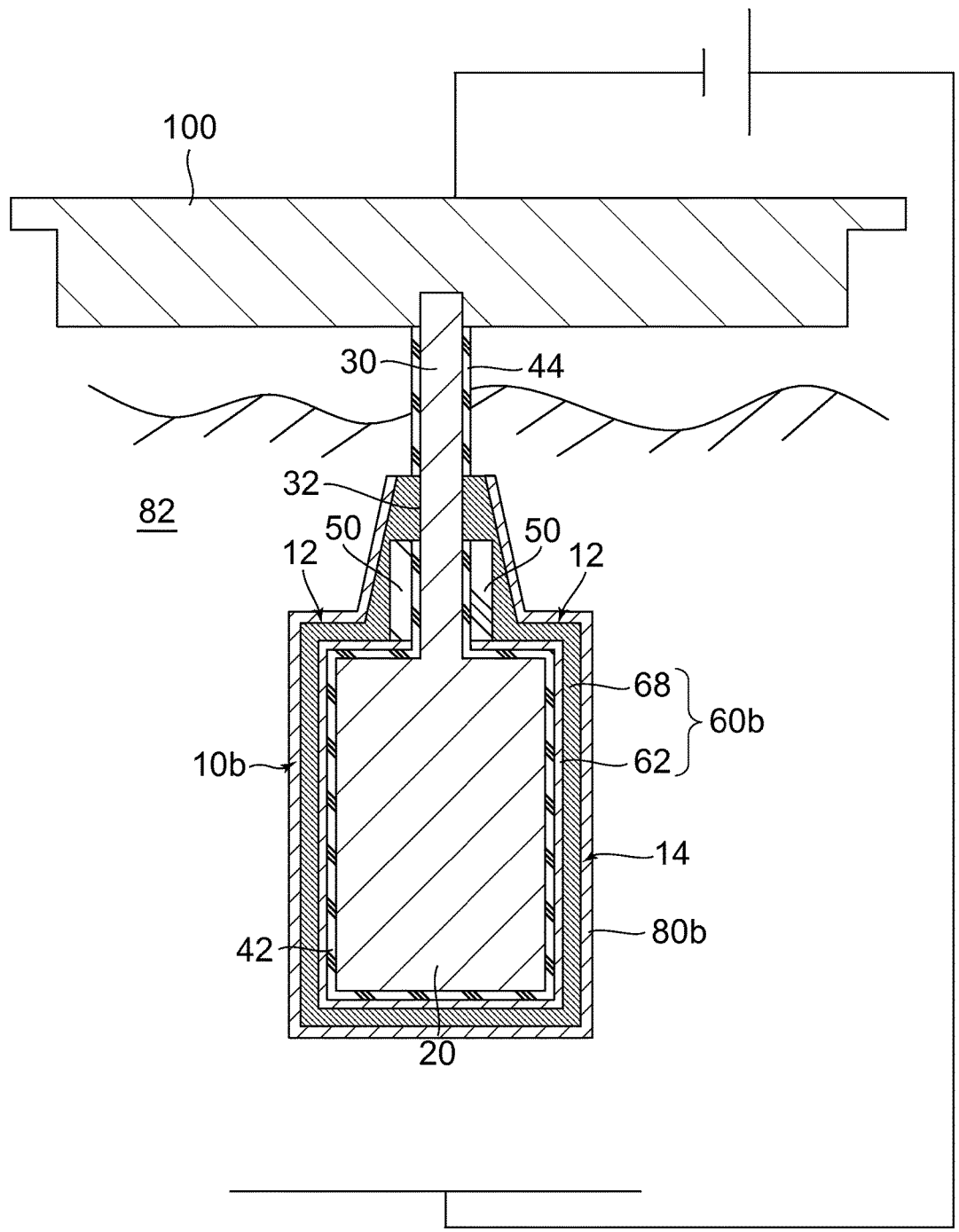
FIG. 13 is a view showing a process of formation of the plated layer of FIG. 11.

Thereafter, as shown in FIG. 13, the cathode layer 60b and so on is soaked into the plating solution 82. In addition, a voltage is applied between the plating solution 82 and the supporter 100 so that an electric potential of the plating solution 82 is higher than another electric potential of the supporter 100, i.e. an electric potential of the anode lead wire 30 or an electric potential of the cathode layer 60b. Thus, the plated layer 80b is formed. Subsequently, the plated layer 80b, the conductive layer 68, the insulative section 50 and the second part 44 are partially removed by using a laser so that the capacitor element 10b covered with the plated layer 80b is obtained as shown in FIG. 11.

The present embodiment can obtain a result similar to that of the second embodiment.

Figure 14:
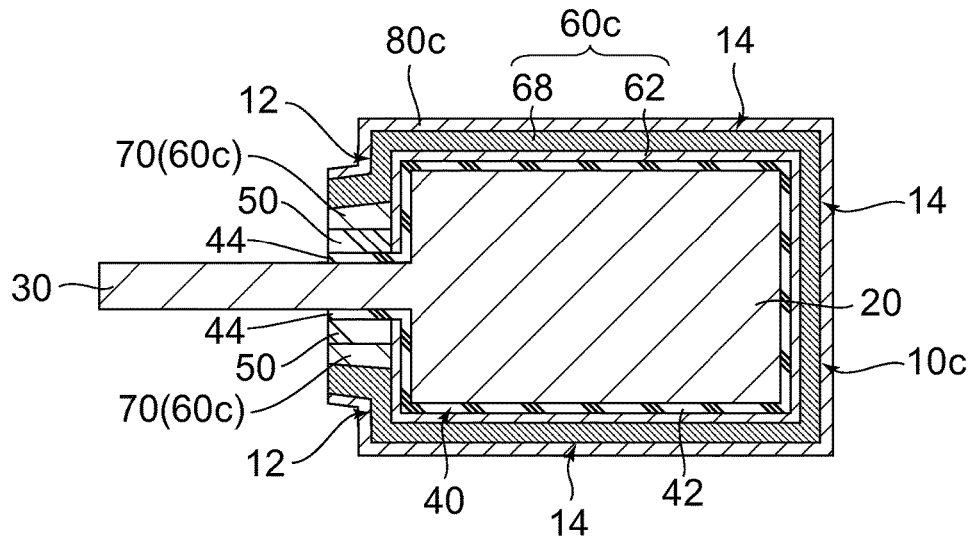
FIG. 14 is a cross-sectional view showing a capacitor element and a plated layer which are included in a solid electrolytic capacitor according to a fourth embodiment of the present invention.

With reference to FIG. 14, a capacitor element 10c according to a fourth embodiment of the present invention is a modification of the capacitor element 10b of the above-mentioned third embodiment. In FIG. 14, components same as those of FIG. 11 are depicted with reference numerals same as those of the same components; explanation about those components will be omitted.

As shown in FIG. 14, a cathode layer 60c of the present embodiment includes the solid electrolyte layer 62, the conductive layer 68 and a conductive section 70. The conductive section 70 is formed on the insulative section 50. The conductive layer 68 is formed on the solid electrolyte layer 62 and is also formed on the conductive section 70. In this embodiment, the conductive section 70 is a rest of a conductor which is used for the formation of the conductive layer 68 of the electrolytic polymerization layer and for the formation of the plated layer 80c, as described in detail hereinbelow.

Figure 15:
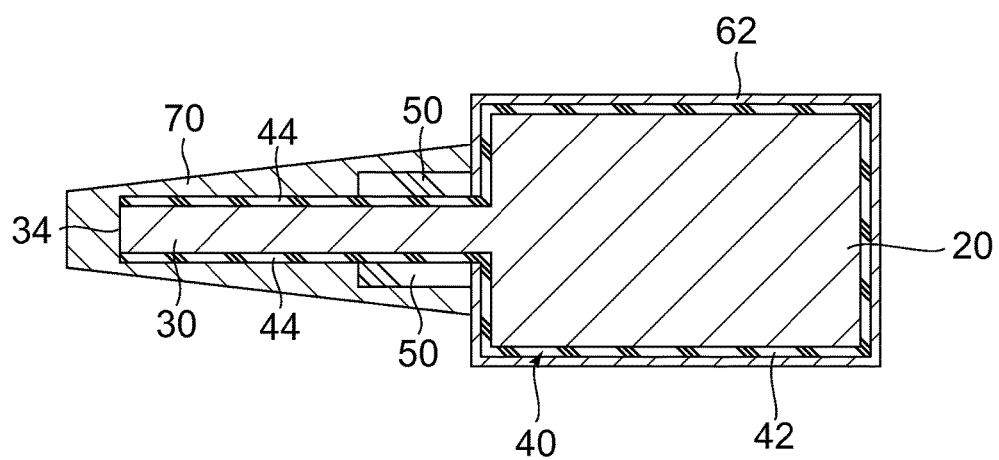
FIG. 15 is a view showing a process of formation of the capacitor element of FIG. 14.
Figure 16:
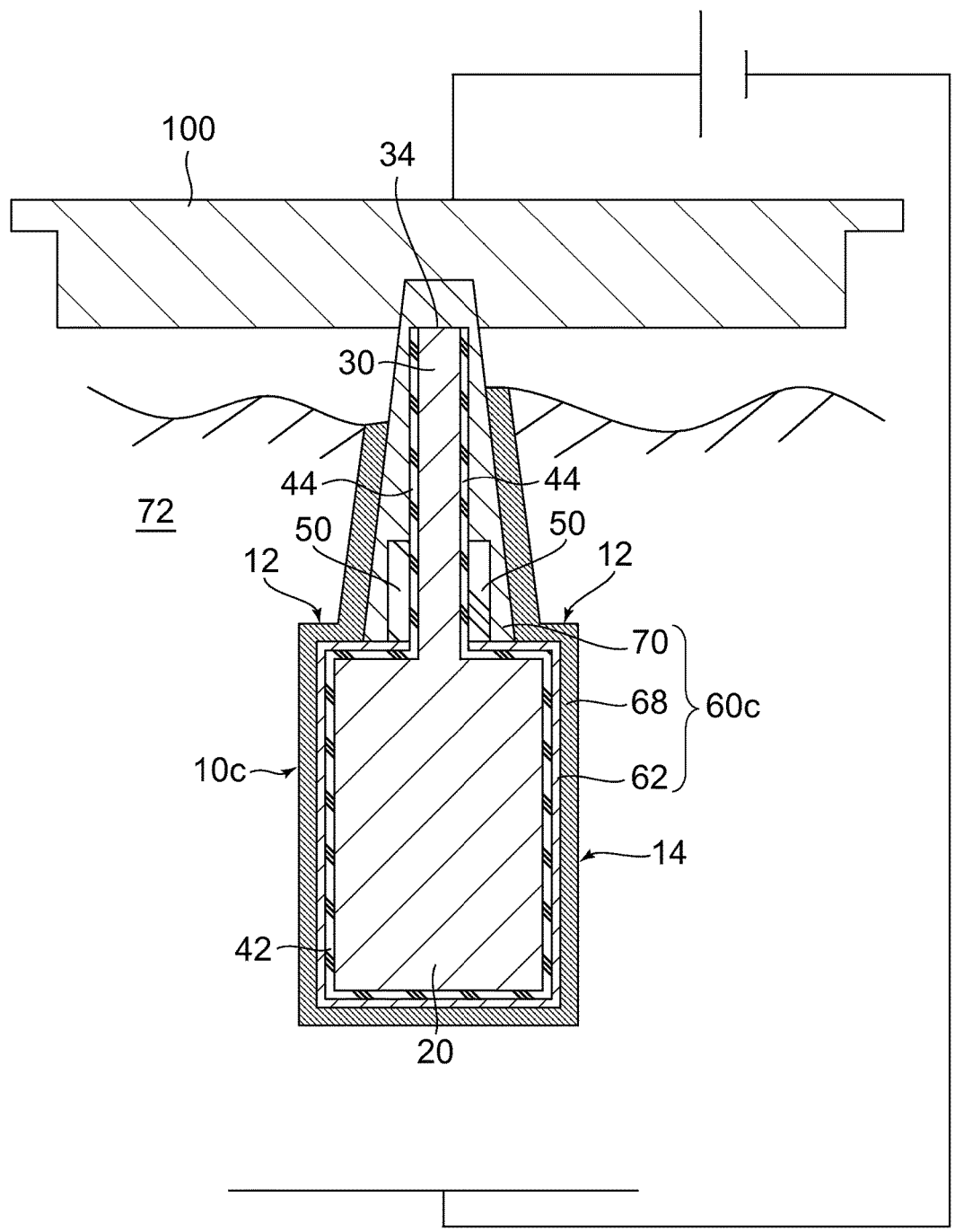
FIG. 16 is a view showing a process of formation of the capacitor element of FIG. 14.

As shown in FIG. 15, after the formation of the insulative section 50, the conductive section 70 is formed so as to connect between an end 34 of the anode lead wire 30 and the solid electrolyte layer 62. Next, as shown in FIG. 16, the electrolyte layer 62 and a part of the conductive section 70 are soaked into a solution of monomers 72 while an end of the conductive section 70 is supported by the supporter 100 made of aluminum. In addition, a voltage is applied between the solution of monomers 72 and the supporter 100 so that an electric potential of the solution of monomers 72 is lower than another electric potential of the supporter 100, i.e. an electric potential of the conductive section 70 or an electric potential of the solid electrolyte layer 62. Thus, electrolytic polymerization is carried out so as to form the conductive layer 68.

Figure 17:
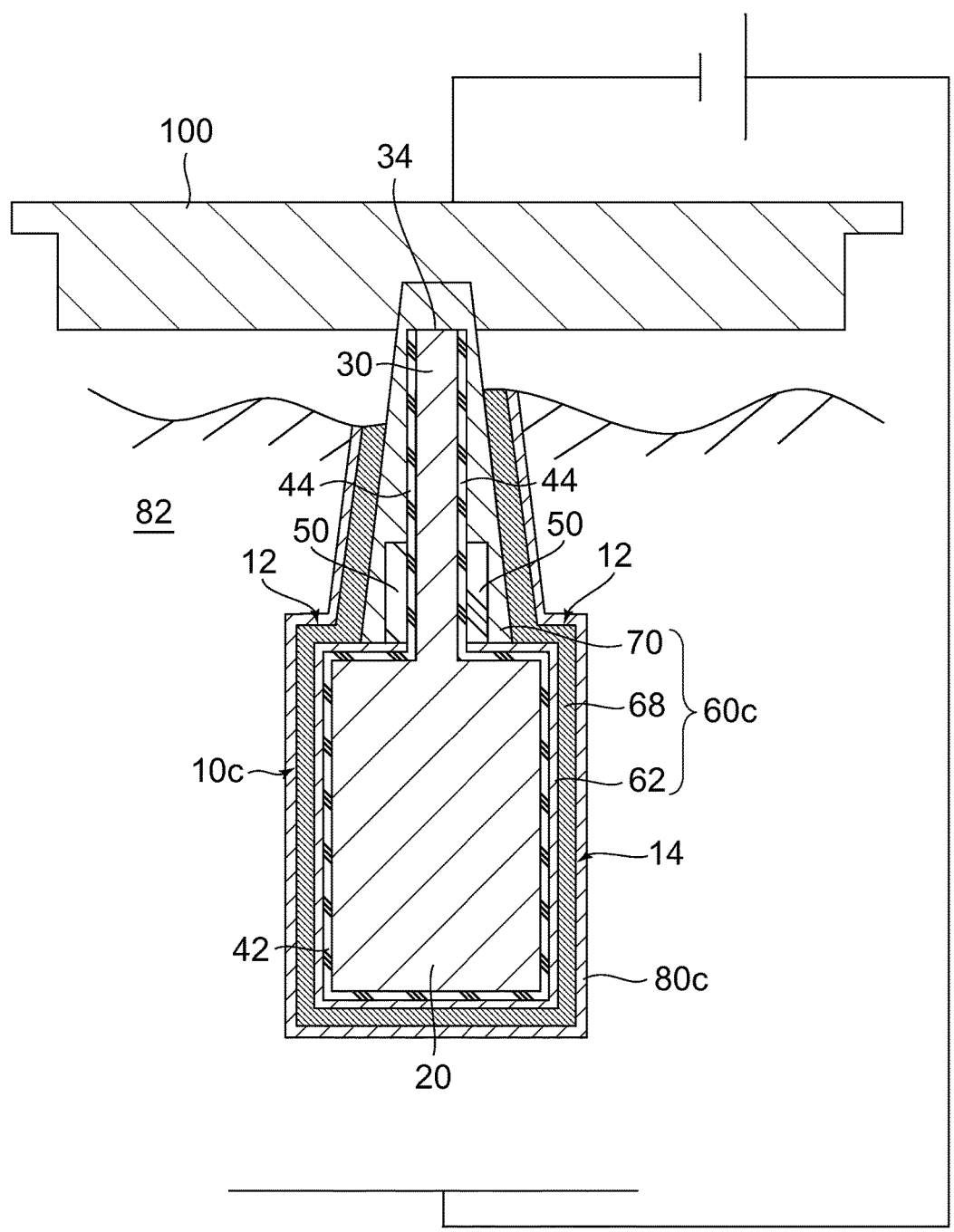
FIG. 17 is a view showing a process of formation of the plated layer of FIG. 14.

Thereafter, as shown in FIG. 17, the cathode layer 60c and so on is soaked into the plating solution 82. In addition, a voltage is applied between the plating solution 82 and the supporter 100 so that an electric potential of the plating solution 82 is higher than another electric potential of the supporter 100, i.e. an electric potential of the conductive section 70 or an electric potential of the cathode layer 60c. Thus, the plated layer 80c is formed. Subsequently, the plated layer 80c, the conductive layer 68, the conductive section 70, the insulative section 50 and the second part 44 are partially removed by using a laser so that the capacitor element 10c covered with the plated layer 80c is obtained as shown in FIG. 14.

The present embodiment can obtain a result similar to that of the third embodiment.

Figure 18:
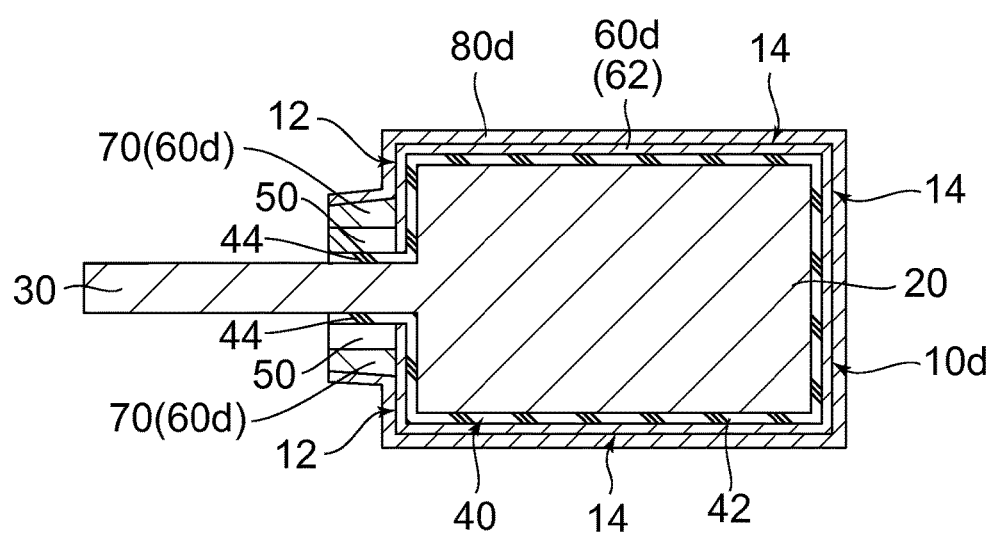
FIG. 18 is a cross-sectional view showing a capacitor element and a plated layer which are included in a solid electrolytic capacitor according to a fifth embodiment of the present invention.

With reference to FIG. 18, a capacitor element 10d according to a fifth embodiment of the present invention is a modification of the capacitor element 10c of the above-mentioned fourth embodiment. In FIG. 18, components same as those of FIG. 14 are depicted with reference numerals same as those of the same components; explanation about those components will be omitted.

As understood from comparison of FIG. 14 with FIG. 18, a cathode layer 60d of the present embodiment is different from the cathode layer 60c of the fourth embodiment in that the cathode layer 60d does not include the conductive layer 68 of electrolytic polymerization layer. In other words, the plated layer 80d of the present embodiment is formed directly on the solid electrolyte layer 62.

Figure 19:
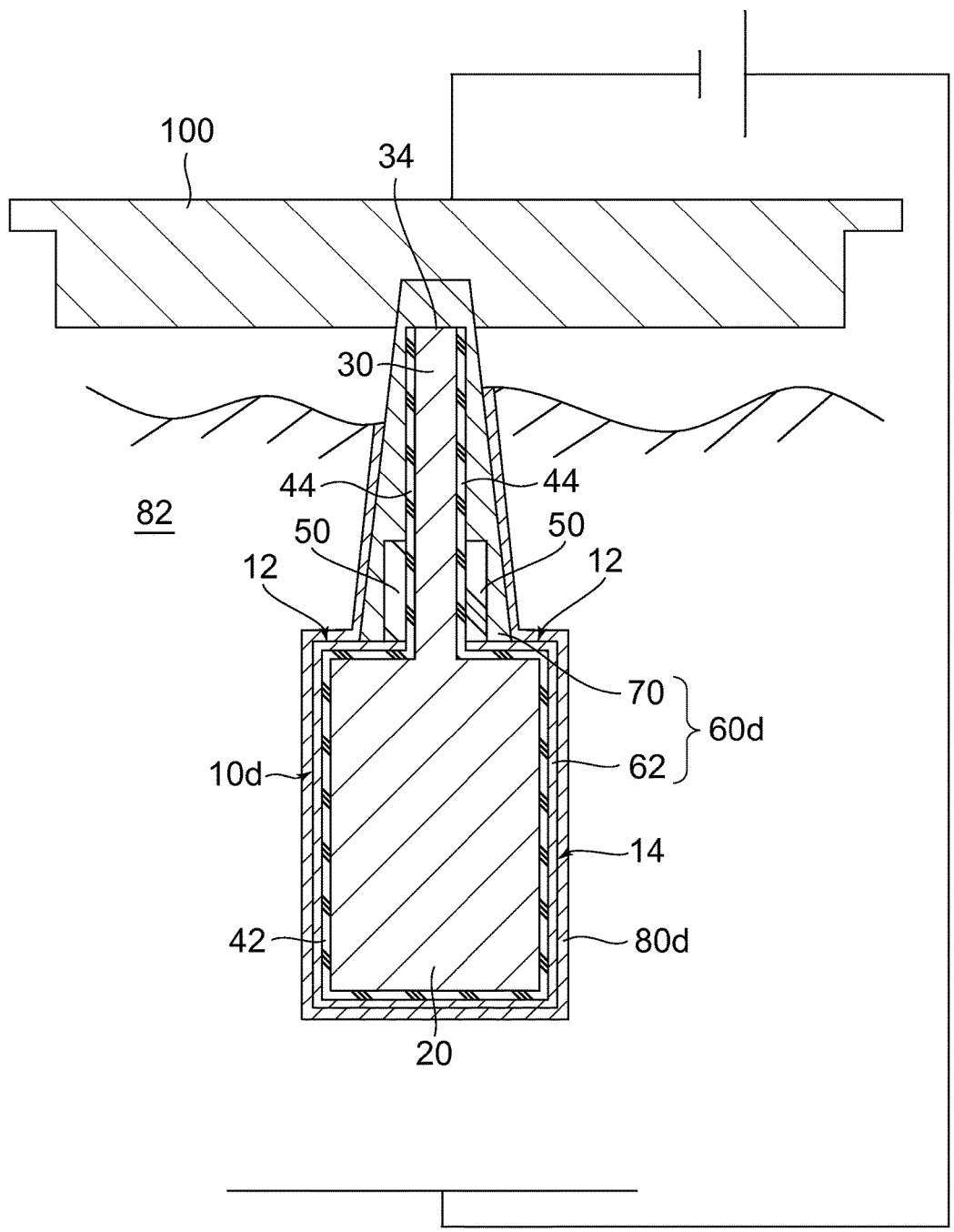
FIG. 19 is a view showing a process of formation of the plated layer of FIG. 18.

In detail, as shown in FIG. 19, after the formation of the conductive section 70, the cathode layer 60d and so on is soaked into the plating solution 82 while an end of the conductive section 70 is supported by the supporter 100 made of aluminum. In addition, a voltage is applied between the plating solution 82 and the supporter 100 so that an electric potential of the plating solution 82 is higher than another electric potential of the supporter 100, i.e. an electric potential of the conductive section 70 or an electric potential of the cathode layer 60d. Thus, the plated layer 80d is formed. Subsequently, the plated layer 80d, the conductive section 70, the insulative section 50 and the second part 44 are partially removed by using a laser so that the capacitor element 10d covered with the plated layer 80d is obtained as shown in FIG. 18.

The present embodiment can obtain a result similar to that of the fourth embodiment.

Figure 20:
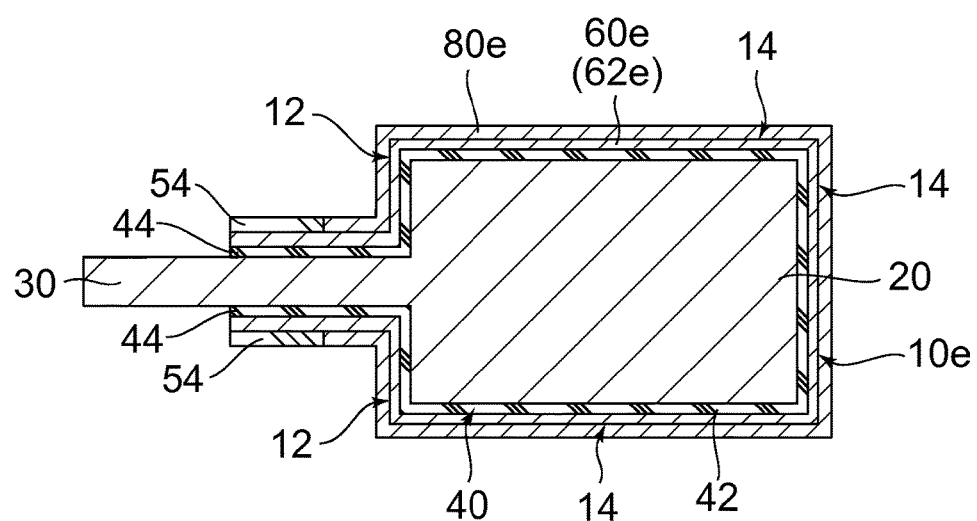
FIG. 20 is a cross-sectional view showing a capacitor element and a plated layer which are included in a solid electrolytic capacitor according to a sixth embodiment of the present invention.

With reference to FIG. 20, a capacitor element 10e according to a sixth embodiment of the present invention is a modification of the capacitor element 10 of the above-mentioned first embodiment. In FIG. 20, components same as those of FIG. 2 are depicted with reference numerals same as those of the same components; explanation about those components will be omitted.

As shown in FIG. 20, a cathode layer 60e of the present embodiment consists of a solid electrolyte layer 60e similar to the solid electrolyte layer 60 of the first embodiment. The solid electrolyte layer 60e covers the second part 44 of the dielectric layer 40. A plated layer 80e is formed directly on the solid electrolyte layer 60e. Furthermore, the capacitor element 10e of the present embodiment includes an insulative separator 54 which is formed on the cathode layer 60e of the solid electrolyte layer 62e. The insulative separator 54 neighbors on the plated layer 80e in the predetermined direction, i.e. the extending direction of the anode lead wire 30. The insulative separator 54 separates the plated layer 80e and the anode lead wire 30 from each other so as to prevent them from being in contact with each other.

The present embodiment can obtain a result similar to that of the first embodiment.

In each of the above-described embodiments, a conductive layer may be formed on the solid electrolyte layer 62, 62e via chemical polymerization.

Although the solid electrolyte layer 62, 62e is made of polythiophene in the above-described embodiments, the present invention is not limited thereto. The solid electrolyte layer 62, 62e may be made of another conductive polymer or may be made of manganese dioxide.

The present application is based on a Japanese patent application of JP2013-250968 filed before the Japan Patent Office on Dec. 4, 2013, the contents of which are incorporated herein by reference.

While there has been described what is believed to be the preferred embodiment of the invention, those skilled in the art will recognize that other and further modifications may be made thereto without departing from the spirit of the invention, and it is intended to claim all such embodiments that fall within the true scope of the invention.

What is claimed is:

1. A solid electrolytic capacitor comprising:
a capacitor element having a predetermined surface and an outer peripheral surface other than the predetermined surface and said capacitor element includes an anode body, an anode lead wire and a cathode layer, the predetermined surface being perpendicular to a predetermined direction, the anode lead wire extending from the anode body along the predetermined direction through the predetermined surface, the cathode layer including a solid electrolyte layer and forming the outer peripheral surface and a part of the predetermined surface; and
a plated layer completely covering the outer peripheral surface and the part of the predetermined surface.

2. The solid electrolytic capacitor as recited in claim 1, wherein:
the capacitor element further includes a dielectric layer;
the dielectric layer has a first part and a second part, the first part being formed on the anode body, the second part being formed on the anode lead wire;
the cathode layer is formed, at least, on the first part of the dielectric layer; and
the plated layer is formed all over the cathode layer.

3. The solid electrolytic capacitor as recited in claim 2, wherein the cathode layer is formed all over the first part of the dielectric layer and extends over at least a part of the second part of the dielectric layer.

4. The solid electrolytic capacitor as recited in claim 2, wherein:
the capacitor element further includes an insulative section;
the insulative section is formed on the second part of the dielectric layer; and
the cathode layer is formed all over the first part of the dielectric layer and the insulative section.

5. The solid electrolytic capacitor as recited in claim 4, wherein the cathode layer comprises a conductive section which is formed on the insulative section and is connected to the solid electrolytic layer.

6. The solid electrolytic capacitor as recited in claim 4, wherein the insulative section is positioned around a root of the anode lead wire.

7. The solid electrolytic capacitor as recited in claim 3, wherein the capacitor element further includes an insulative separator which is formed on the cathode layer and neighbors on the plated layer in the predetermined direction.

8. The solid electrolytic capacitor as recited in claim 1, wherein the cathode layer further includes a conductive layer which is formed on the solid electrolyte layer.

9. The solid electrolytic capacitor as recited in claim 8, wherein the conductive layer comprises a graphite paste layer which is formed, at least, on the solid electrolytic layer.

10. The solid electrolytic capacitor as recited in claim 8, wherein the conductive layer comprises an electrolytic polymerization layer which is formed, at least, on the solid electrolytic layer.

11. The solid electrolytic capacitor as recited in claim 1, wherein the part of the predetermined surface has an area equal to or more than 10% of a total area of the predetermined surface.

12. The solid electrolytic capacitor as recited in claim 1, wherein the part of the predetermined surface has an area equal to or more than 50% of a total area of the predetermined surface.

* * * * *